F. B. MILES.
Automatically Operating Shafts.
No. 142,494.          Patented September 2, 1873.
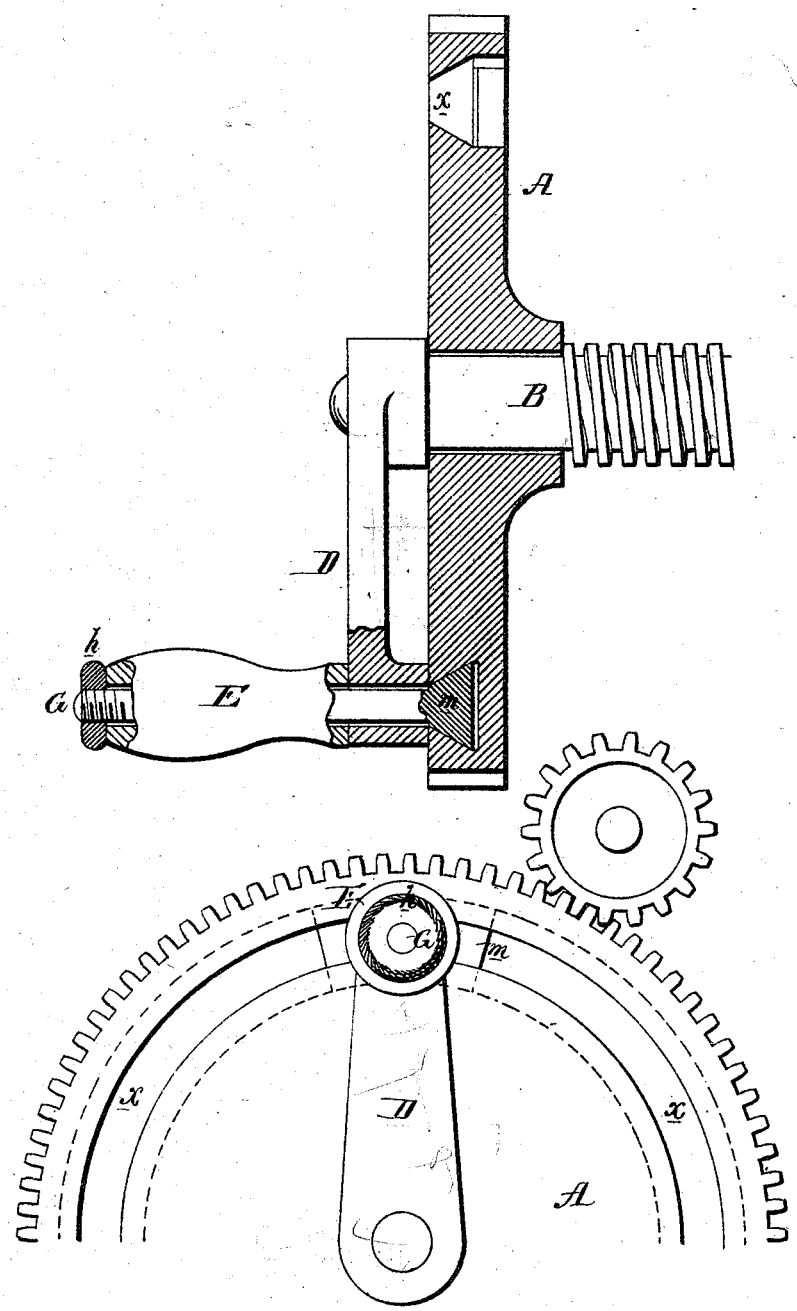

UNITED STATES PATENT OFFICE.

FREDERICK B. MILES, OF PHILADELPHIA, PENNSYLVANIA, ASSIGNOR TO OSCAR C. FERRIS AND FREDERICK B. MILES, OF SAME PLACE.

IMPROVEMENT IN AUTOMATICALLY OPERATING SHAFTS.

Specification forming part of Letters Patent No. 142,494, dated September 2, 1873; application filed August 4, 1873.

*To all whom it may concern:*

Be it known that I, FREDERICK B. MILES, of Philadelphia, Pennsylvania, have invented a Device for Manipulating and Automatically Operating Shafts, of which the following is a specification:

The object of my invention is to readily place a shaft for feeding the slide of a lathe, or for operating any mechanism under the control of a wheel, through the medium of which the said shaft has to be automatically operated, or under the control of a handle, by which the shaft may be manipulated; and this object I attain by the combination of a feed-wheel, A, hung loosely on the shaft B, carrying an arm, D, the handle E of which is connected to both arm and wheel by a bolt having a head adapted to an annular groove in the wheel, so that when the nut $h$ of the bolt is loosened the wheel can revolve without disturbing the arm, and when the nut is tight the arm and handle become a part of the wheel.

In the present instance, B is supposed to be a screw-shaft for operating the slide-rest of a lathe, or the screw-shaft of a planing-machine slide; or it may be any other shaft which has to be operated either automatically or by hand, A representing the cog-wheel, through the medium of which the screw has to be turned automatically. This wheel has an annular dovetailed groove, $x$, for receiving the head $m$ of the bolt G, which passes through the end of the arm D secured to the shaft B, and through the handle E, and is furnished with a nut, $h$, the edge of the latter being milled or otherwise roughened, so that it can be readily manipulated.

On loosening this nut the head $m$ of the bolt G will be loose in the groove $x$ of the wheel, and consequently the latter will cease to control the shaft B, which can be turned by the manipulation of the handle E and arm D, while the independent automatic movement of the wheel A continues. On screwing the nut tight, however, the head $m$ of the bolt G will be securely confined within the groove $x$ of the wheel, and whatever movement may be imparted to the latter must be transmitted through the medium of the arm D to the shaft B.

I claim as my invention—

The combination of the shaft B, feed-wheel A, and its annular groove $x$ with the arm D, handle E, and bolt G, or its equivalent.

In testimony whereof I have signed my name to this specification in the presence of two subscribing witnesses.

F. B. MILES.

Witnesses:
   WM. A. STEEL,
   HUBERT HOWSON.